US012576358B2

(12) United States Patent
Dominguez-Gutierrez et al.

(10) Patent No.: US 12,576,358 B2
(45) Date of Patent: Mar. 17, 2026

(54) LIQUID BATH AIR FILTER

(71) Applicant: UNIVERSITY OF FLORIDA RESEARCH FOUNDATION, INCORPORATED, Gainesville, FL (US)

(72) Inventors: Paul R. Dominguez-Gutierrez, Gainesville, FL (US); Tania Quesada, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 327 days.

(21) Appl. No.: 18/271,083

(22) PCT Filed: Jan. 6, 2022

(86) PCT No.: PCT/US2022/011389
§ 371 (c)(1),
(2) Date: Jul. 6, 2023

(87) PCT Pub. No.: WO2022/150441
PCT Pub. Date: Jul. 14, 2022

(65) Prior Publication Data
US 2024/0198271 A1 Jun. 20, 2024

Related U.S. Application Data

(60) Provisional application No. 63/134,423, filed on Jan. 6, 2021.

(51) Int. Cl.
B01D 47/02 (2006.01)
F02M 35/026 (2006.01)
(52) U.S. Cl.
CPC ......... B01D 47/021 (2013.01); F02M 35/026 (2013.01)

(58) Field of Classification Search
CPC ........ B01F 23/23121; B01F 23/231267; B01F 23/231264; B01D 47/02; B01D 47/021;
(Continued)

(56) References Cited

U.S. PATENT DOCUMENTS 615,093 A * 11/1898 McIntyre ............... B01D 47/02
122/491
1,182,260 A * 5/1916 Fleming ................ A61M 16/16
261/142
(Continued)

FOREIGN PATENT DOCUMENTS

EP 0735266 A1 * 10/1996 ........... B01D 47/021
GB 900746 A * 7/1962 ........... B01D 47/028
(Continued)

OTHER PUBLICATIONS

PCT search report & written opinion, PCT/US2022/011389, mailed May 18, 2022.

*Primary Examiner* — Duane Smith
(74) *Attorney, Agent, or Firm* — Timothy H. Van Dyke; Wolter Van Dyke Davis, PLLC

(57) ABSTRACT

A liquid bath air filter (100), including: an air inlet tube (102) that defines an air inlet passage (108); a filtrate chamber body (120) that defines a filtrate chamber (142) configured to hold a liquid in a bottom thereof; and a flow laminator (150) configured to: receive air from the air inlet passage; be submerged in the liquid present in the filtrate chamber when the apparatus is in an upright position; reduce a Reynold's number of a flow of the air therethrough; and eject the flow into the liquid in the filtrate chamber.

19 Claims, 11 Drawing Sheets

(58) Field of Classification Search
CPC .. B01D 47/024; B01D 47/025; B01D 47/027; B01D 47/028; F02M 35/026
USPC .... 95/226; 96/257, 256, 262, 269, 276, 278, 96/279, 329–354; 261/121.1, 124, 126
See application file for complete search history.

(56) References Cited

U.S. PATENT DOCUMENTS

| | | | | | |
|---|---|---|---|---|---|
| 1,242,445 | A | * | 10/1917 | Ittner | B01F 23/2331 261/87 |
| 1,273,501 | A | * | 7/1918 | Kimber | F25C 1/18 261/121.1 |
| 1,325,381 | A | * | 12/1919 | Silver | F02M 25/00 134/102.1 |
| 1,329,252 | A | * | 1/1920 | Millard | F02M 25/0225 261/18.2 |
| 1,838,511 | A | * | 12/1931 | Wilson | F02M 35/026 55/355 |
| 1,940,034 | A | * | 12/1933 | Wallace | F02M 35/026 55/DIG. 27 |
| 2,004,467 | A | * | 6/1935 | Charles | F02M 35/024 55/455 |
| 2,159,551 | A | * | 5/1939 | Darnell | F02M 35/026 55/DIG. 27 |
| 2,171,752 | A | * | 9/1939 | Kamrath | B01D 46/10 55/DIG. 27 |
| 2,387,278 | A | | 10/1945 | Lowther | |
| 2,490,959 | A | * | 12/1949 | Gregory | F02M 35/026 96/416 |
| 2,668,699 | A | * | 2/1954 | Szekely | B01F 23/2312 239/548 |
| 2,677,601 | A | * | 5/1954 | Ruth | B01D 51/10 422/171 |
| 2,785,962 | A | * | 3/1957 | Ruth | F01N 3/02 422/171 |
| 2,988,166 | A | * | 6/1961 | Klemm | F02M 35/02 96/341 |
| 2,996,287 | A | * | 8/1961 | Audran | B01F 27/81 261/87 |
| 3,061,993 | A | * | 11/1962 | Gustavsson | B01D 47/025 96/349 |
| 3,325,975 | A | * | 6/1967 | Coverston | F02M 33/04 96/309 |
| 3,550,917 | A | * | 12/1970 | Cochran | B01F 25/2123 248/287.1 |
| 3,650,513 | A | * | 3/1972 | Werner | B01F 23/23123 261/87 |
| 3,700,111 | A | | 10/1972 | Bode | |
| 4,116,647 | A | * | 9/1978 | Garner | B01D 47/024 96/275 |
| 4,169,047 | A | * | 9/1979 | Wilson | B03D 1/1487 261/87 |
| 4,224,042 | A | * | 9/1980 | Garigioli | F02M 35/026 55/299 |
| 4,235,609 | A | * | 11/1980 | Garigioli | F02M 35/026 55/498 |
| 4,282,172 | A | * | 8/1981 | McKnight | B01F 23/23231 210/220 |
| 4,300,924 | A | * | 11/1981 | Coyle | B01D 47/025 96/330 |
| 4,477,341 | A | * | 10/1984 | Schweiss | B03D 1/1406 261/DIG. 75 |
| 5,215,560 | A | * | 6/1993 | Lee | A47L 9/185 55/357 |
| 5,520,714 | A | * | 5/1996 | Muschelknautz | F23G 7/085 96/349 |
| 5,914,034 | A | * | 6/1999 | Ding | B04B 11/06 210/512.3 |
| 6,402,816 | B1 | * | 6/2002 | Trivett | B01D 47/021 96/353 |
| 7,033,547 | B1 | * | 4/2006 | Ichikawa | B01D 47/021 423/239.1 |
| 8,136,797 | B2 | * | 3/2012 | Duesel, Jr. | B01D 1/305 261/123 |
| 8,382,075 | B2 | * | 2/2013 | Duesel, Jr. | B01D 1/14 261/126 |
| 2003/0029316 | A1 | * | 2/2003 | Campbell | B65D 88/745 96/351 |
| 2005/0022668 | A1 | * | 2/2005 | Cairns | F01N 3/04 95/226 |
| 2011/0304063 | A1 | * | 12/2011 | Ko | C02F 3/201 261/77 |
| 2019/0060819 | A1 | | 2/2019 | Baxter et al. | |
| 2024/0198271 | A1 | * | 6/2024 | Dominguez-Gutierrez | F02M 35/026 |

FOREIGN PATENT DOCUMENTS

| | | |
|---|---|---|
| WO | 1999019046 | 4/1999 |
| WO | 2010017572 | 2/2010 |

* cited by examiner

LIQUID BATH AIR FILTER

FIELD OF THE INVENTION

The invention relates to an air filter that uses a liquid bath to filter the air.

BACKGROUND OF THE INVENTION

Originally, a water bath air filter was developed in 1910 by John Deere to give their tractors a competitive advantage over their competitors in instances where dust was a major issue in engine reliability. Even today, oil bath filters are used in industrial settings due to their high capacity for filtration and reusability. However, with respect to using liquid baths as part of an air filter, there remains room in the art for improvement.

SUMMARY

In a first example embodiment, a water bath air filter includes: an air inlet tube that defines an air inlet passage; a filtrate chamber body that defines a filtrate chamber configured to hold a liquid in a lower portion thereof; and a flow laminator configured to: receive air from the air inlet passage; be submerged in the liquid present in the filtrate chamber when the apparatus is in an upright position; reduce a Reynold's number of a flow of the air therethrough; and eject the flow into the liquid in the filtrate chamber.

In a second example embodiment, the water bath air filter includes: a filtrate chamber body that defines a filtrate chamber comprising: an upper portion; a middle portion; a lower portion configured to hold a liquid; and a drain-stopping conduit including an inlet in the middle portion and an outlet through a top of the filtrate chamber body; an air inlet tube; a flow laminator configured to: receive air from the air inlet tube; be disposed in the lower portion; and reduce a Reynold's number of a flow of the air therethrough; and a flow circuit in which air flows into the air inlet tube, then through the flow laminator, then into the lower portion, then into the middle portion, then through the drain-stopping conduit, then through the outlet through the top of the filtrate chamber body. When the water bath air filter is in an upright position and the liquid is disposed in the lower portion, an outlet of the flow laminator is submerged in the liquid. When in an upside-down position, the liquid is retained in the upper portion and the flow circuit remains open.

BRIEF DESCRIPTION OF THE DRAWINGS

The invention is explained in the following description in view of the drawings that show:

FIG. 2 is a cutaway view of the example embodiment of the liquid bath air filter of FIG. 1 in an upside-down position.

FIG. 7 is a cutaway view of the example embodiment of the liquid bath air filter of FIG. 6 in a tilted position.

DETAILED DESCRIPTION OF THE INVENTION

The present inventors have created a unique and innovative liquid bath air filter that improves upon the water bath air filter technology used in industrial settings. The liquid bath air filter disclosed herein incorporates a flow laminator intended to align streamlines in a flow of air to achieve a laminar flow. The laminator ejects the aligned flow of air into a liquid bath and a mixing of the air and the liquid bath entrains particulates in the liquid bath, thereby filtering the air. In an example embodiment, the liquid bath air filter is configured to retain the liquid bath therein even in the event that the liquid bath air filter is tilted or overturned.

Figure 1:
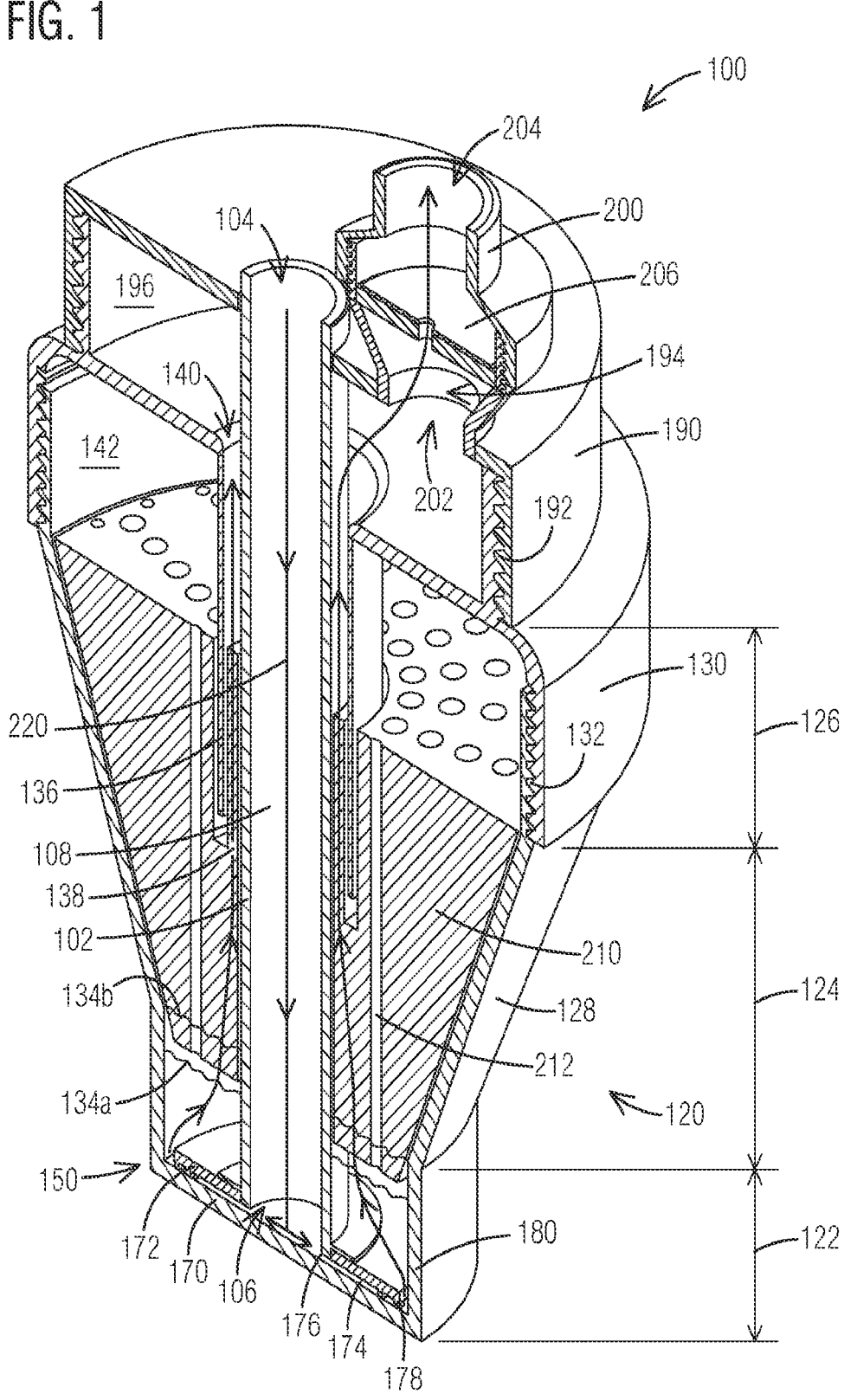
FIG. 1 is a cutaway view of an example embodiment of a liquid bath air filter disclosed herein in an upright position.

FIG. 1 is a cutaway view of an example embodiment of a liquid bath air filter 100 disclosed herein in an upright position. The liquid bath air filter 100 includes an air inlet tube 102 having an inlet 104, an outlet 106, and defining an air inlet passage 108 therethrough. Also included is a filtrate chamber body 120 defining a lower portion 122, a middle portion 124, and an upper portion 126 of a filtrate chamber 142. Although the portions are associated with physically distinct portions of the filtrate chamber body 120 in the example embodiment shown, this need not be the case. The portions can be sized relative to each other as needed to accomplish their respective roles disclosed herein. In an example embodiment, the filtrate chamber body 120 is formed by assembling a filtrate chamber bottom 128 to a filtrate chamber top 130 via, for example, a threaded connection 132. The lower portion 122 is configured to hold a volume of liquid (e.g. 70 milliliters) therein that defines example liquid levels 134$a$, 134$b$. In an example embodiment, the filtrate chamber body 120 includes a drain-stopping conduit 136 having an inlet 138 disposed in the middle portion 124 of the filtrate chamber body 120 and an outlet 140 through a top of the upper portion 126 of the filtrate chamber body 120.

A flow laminator 150 is positioned so that the flow laminator 150 is submerged in the liquid when the liquid bath air filter 100 is in the upright position shown in FIG. 1. The flow laminator 150 is designed to align streamlines in a flow of air entering the flow laminator 150 from the air inlet passage 108, thereby making the flow more laminar. More turbulent flows are characterized by higher Reynold's numbers, while more laminar flows are characterized by lower Reynold's numbers. As such, in an example embodiment, a function of the flow laminator 150 is to reduce the flow's Reynold's number. In an example embodiment, the flow laminator 150 achieves laminar flow of the air flowing in the flow laminator 150. In such an embodiment, the flow laminator 150 generates a Reynold's number of up to 2300. In various example embodiments, the Reynold's number can range from 1400 to 6000. In an example embodiment, the flow laminator 150 is designed to accelerate the flow entering the flow laminator 150. Hence, in such an embodiment, the flow laminator 150 is a nozzle. The liquid can be any liquid that is suitable for the requirements. Example liquids include water, twenty (20) percent saline solution, mineral oil etc. Using water as the filter eliminates any need to have spare filters because the water can be readily replaced.

In the example embodiment shown, the flow laminator 150 includes cooperating walls 170, 172 that define an annular flow path 174 that forms the air into a sheet. Air initially impacts the liquid at the bottom of the air inlet tube 102 before entering the flow laminator 150, at which time some initial mixing of the air and the liquid may occur. A radially inner edge 176 of the annular flow path 174 receives the air from the air inlet passage 108, and a radially outer edge 178 of the annular flow path 174 ejects the air into the liquid in the filtrate chamber 142. The flow laminator 150 forms a laminar flow of mostly, if not solely air. In this example embodiment, the filtrate chamber lower portion 122 includes a redirect 180 configured to redirect flow ejected into the liquid at, for example, a ninety (90) degree angle. This redirect causes the ejected air to impinge on the filtrate chamber body 120. The ejected particles entrained in the ejected air impact the chamber wall. This enhances the mixing of the ejected air and the liquid and helps entrain any particulate in the liquid, thereby filtering the air. The mixing of the air with the liquid plus the impact of the particles on the chamber wall may account for a majority of the filtration. In an example embodiment, the cooperating walls 170, 172 are configured to maintain a constant distance from each other from the radially inner edge 176 to the radially outer edge 176. In an example embodiment, the constant distance is not greater than one millimeter. The cooperating walls 170, 172 shows are flat, but the other cooperating shapes can be used. For example, the cooperating walls 170, 172 could form a conical shape, or each cooperating wall could undulate circumferentially (like a flattened or conically-formed cupcake paper liner). Any shape that tends to make the air flowing therein be more laminar is acceptable.

In an example embodiment, a lid 190 is secured to the filtrate chamber body 120 via, for example, a threaded connection 192 with the filtrate chamber top 130. The lid 190 fluidically isolates the outlet 140 through a top of the upper portion 126 of the filtrate chamber body 120 from the inlet 104 of the air inlet tube 102. The lid 190 provides a fluid path from the outlet 140 through a top of the upper portion 126 of the filtrate chamber body 120 to a lid outlet 194. The lid 190 further defines an outlet chamber 196 in which a matrix such as a scrub sponge (e.g. SCOTCH-BRITE®), stainless steel, or a nylon scrubber can be installed to further prevent liquid particles from escaping. This may be an extra layer of protection when seeking to contain biologicals such as SARS-COVID 2.

In an example embodiment, a check valve 200 is disposed in the lid outlet 194 and is configured to prevent air from entering the filtrate chamber 142 through the lid outlet 194. In this example embodiment, the check valve 200 includes a check valve inlet 202, a check valve outlet 204, and a check valve flap 206 that prevents reverse flow.

In the example embodiment shown, the air inlet tube 102 extends from the flow laminator 150, through the drain-stopping conduit 136, and out of the filtrate chamber body 120 via the outlet 140 through the top of the filtrate chamber body 120. However, other configurations are acceptable. For example, the air inlet tube 102 could penetrate the top of the filtrate chamber body 120 at a discrete location that is unrelated to the drain-stopping conduit 136.

In an example embodiment, the liquid bath air filter 100 includes a buffer assembly 210 disposed in the middle portion 124 and configured to filter air exiting the liquid and enroute to the inlet 138 of the drain-stopping conduit 136. The buffer assembly provides increased surface area for microdroplets of the liquid entrained in the air to condense and drip back into the lower portion 122. This also reduces the chances of any entrained liquid exiting the filtrate chamber 142. The buffer assembly 210 may be discrete and thereby readily maintained or replaced. In an example embodiment, the buffer assembly 210 is composed of 3D copper filaments. In an alternate example embodiment, the buffer assembly may include porous material such as a non-absorbent sponge (e.g. MAGIC-ERASER™) and/or may include MICROBAN™, and/or QMT™, manufactured by Quick Med Technologies of Gainesville, FL, or similar bonded antimicrobials/antivirals.

The buffer assembly 210 shown is a simple porous body that includes holes 212 therethrough that permit passage of the liquid in the lower portion 122 to the upper portion 126 when the liquid bath air filter 100 is inverted. When the liquid is at liquid level 134a, the liquid does not contact the buffer assembly 210, and when the liquid is at liquid level 134b, the liquid contacts the buffer assembly 210 when the liquid bath air filter 100 is in the upright position. The latter allows the liquid in the lower portion 122 to wick up a portion of the buffer assembly 210, thereby wetting that portion and making that portion more effective at filtering the air flowing therethrough. The buffer assembly 210 also reduces evaporation of the liquid, mitigates movement of the liquid out of the lower portion 122 due to motion of the liquid bath air filter 100 during a user's daily activities, and muffles sounds made by the air mixing with the liquid. In addition, the buffer assembly 210 makes it easier for the user to breath. While not limiting to any underlying theory of operation, it is thought that the surface tension of the liquid is reduced when the buffer assembly 210 protrudes downward past liquid level 134b and into the liquid, thereby reducing the surface tension of the liquid.

As indicated by flow circuit 220, with each intake of breath by a user, air flows into the air inlet tube 102, then through the flow laminator 150, then into the lower portion 122, then into the middle portion 124, then through the drain-stopping conduit 136, then through the outlet 140 through the top of the filtrate chamber body 120, then out the lid 190, then through the check valve 200 to exit the liquid bath air filter 100. In an example embodiment, the check valve outlet 204 is fluidically connected to an inlet of a continuous positive airway pressure therapy (CPAP) mask. The liquid bath air filter 100 is not a high pressure air filter like that of the prior art. The draw is that which is created by the user's intake of breath. Developing a laminar flow in a relatively low pressure differential system like this is a unique aspect of the liquid bath air filter 100. In example embodiments, the liquid bath air filter 100 can accommodate a range of flow rates. Examples include: a resting flow rate of around fifteen (15) liters per minute with an inlet velocity of around 0.79 meters per second; and a light activity flow rate of sixty (60) liters per minute and 3.16 meters per second.

By virtue of the threaded connections 132, 192, the liquid bath air filter 100 can readily be disassembled and cleaned and sterilized using, for example, a solution with a 1:10 ratio of bleach to water. The components of the liquid bath air filter 100 can be molded, additively manufactured, or subtractively manufactured. For example, the components can be 3D printed using a Fused Deposition Modeling (FDM) printer using polylactic acid (PLA) plastic, polyethylene terephthalate glycol (PTEG) plastic, and FDA approved antimicrobial NANOCLEAN MD™-filament by Copper3D of Santiago, Chile.

Figure 2:
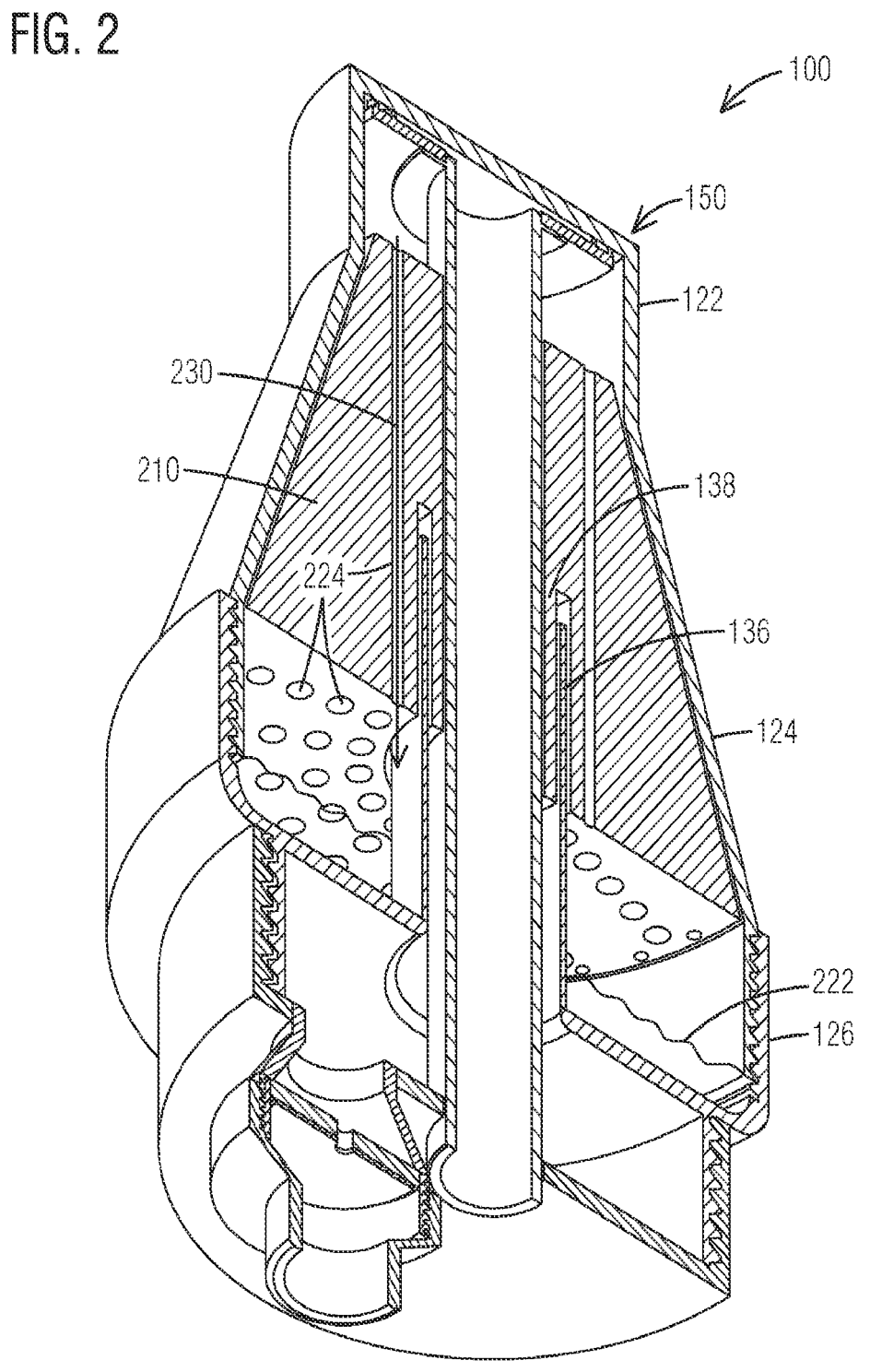

FIG. 2 is a cutaway view of the example embodiment of the liquid bath air filter 100 of FIG. 1 in an upside-down position. Upon being inverted to the upside-down position, the liquid previously disposed in the lower portion 122 passes through the buffer assembly 210 and into the upper portion 126. The upper portion 126 is water-tight. The inlet 138 of the drain-stopping conduit 136 is disposed above a waterline 222 of the liquid now captured in the upper portion 126. This arrangement stops the liquid from draining out of the upper portion 126 when the liquid bath air filter 100 is tilted or in the upside-down position. The flow circuit 220 remains open when the liquid bath air filter 100 is tilted or in the upside-down position. The main difference is that the air ejected from the flow laminator 150 is not ejected into liquid because the liquid has drained by gravity into the upper portion 126. Trapping the liquid in the manner is understood to be a novel feature of the liquid bath air filter 100, perhaps because prior art liquid bath air filters were never intended for use as respirators and hence, not designed to accommodate the movement associated with respirators.

In an example embodiment, the buffer assembly 210 includes holes 224 therethrough that create a flow path 230 for liquid traveling from the lower portion 122 to the upper portion 126 and back. When the liquid flows through the buffer assembly 210, via the holes 224 and/or a porosity of the buffer assembly 210, the buffer assembly is wetted by the liquid. When in the upside-down position, the wetting of the buffer assembly 210 resulting from the movement of the liquid therethrough increases the filtering capacity of the buffer assembly 210. This at least somewhat mitigates for a time the filtering lost by not being ejected into the liquid in the lower portion 122.

Figure 3:
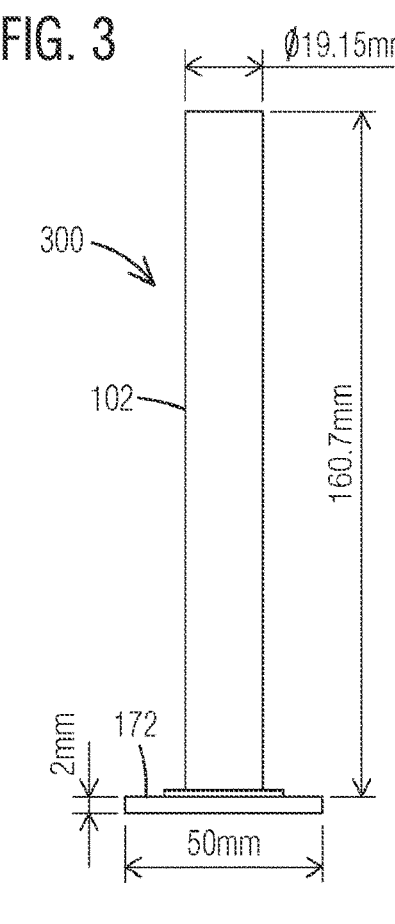
FIG. 3 is a side view of an example embodiment of an intake assembly.

FIG. 3 is a side view of an example embodiment of an intake assembly 300 that includes the air inlet tube 102 and wall 172 of the flow laminator 150 with example dimensions (in millimeters). In the example embodiment shown, the other wall, wall 172, of the flow laminator 150 is simply a bottom of the lower portion 122 of the filtrate chamber body 120. However, the flow laminator 150 could readily be a self-contained unit and positioned in terms of the flow of air in the flow circuit 220 between the air inlet tube 102 and the lower portion 122.

Figure 4:
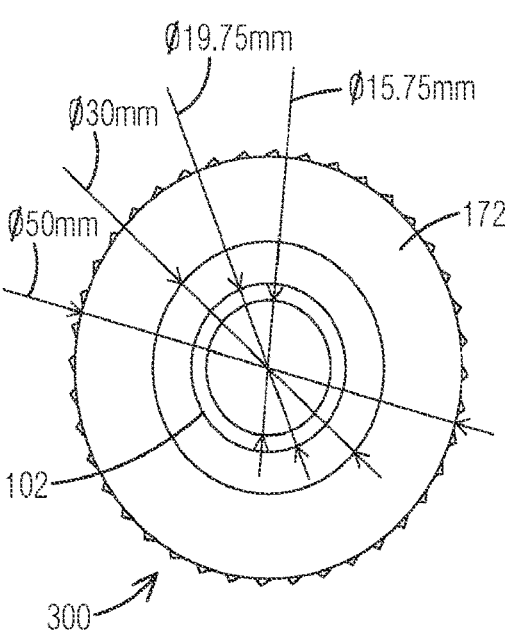
FIG. 4 is a top view of the intake assembly of FIG. 3.

FIG. 4 is a top view of the intake assembly 300 of FIG. 3 with example dimensions (in millimeters).

Figure 5:
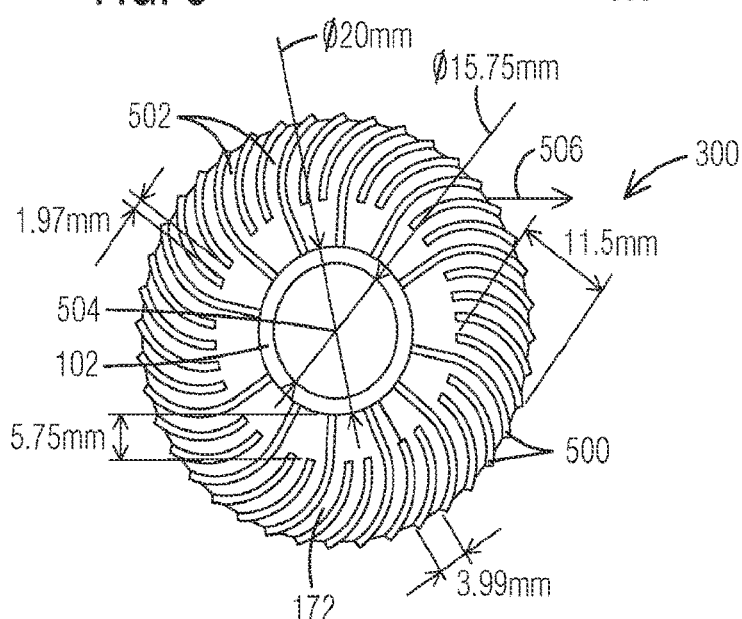
FIG. 5 is a bottom view of the intake assembly of FIG. 3.

FIG. 5 is a bottom view of the intake assembly 300 of FIG. 3 with example dimensions (in millimeters). In this example embodiment, the wall 170 of the flow laminator 150 includes flow separators 500 that contact the wall 172 to divide the annular flow path 174 into an annular array of discrete flow paths 502 therebetween. In an alternate example embodiment, the flow separators 500 protrude toward but do not reach wall 172. In the alternate example embodiment, the flow separators 500 thereby form an annular array of non-discrete flow paths 502 in a portion of a thickness of the flow of air, which influences a remainder of the thickness of the flow. With respect to a center 504 of the annular flow path 174, from radially inside to radially outside, the flow separators extend first radially, then radially and circumferentially. The discrete flow paths 502 each eject a respective flow of air in a direction 506 that has both a radial component and a circumferential component. In such an embodiment, the air ejected into the liquid is thereby swirled about the center 504 of the annular flow path 174, which enhances mixing and the associated filtering of the air. In various embodiments, the direction 506 can include anything from a larger circumferential component to no circumferential component.

Figure 6:
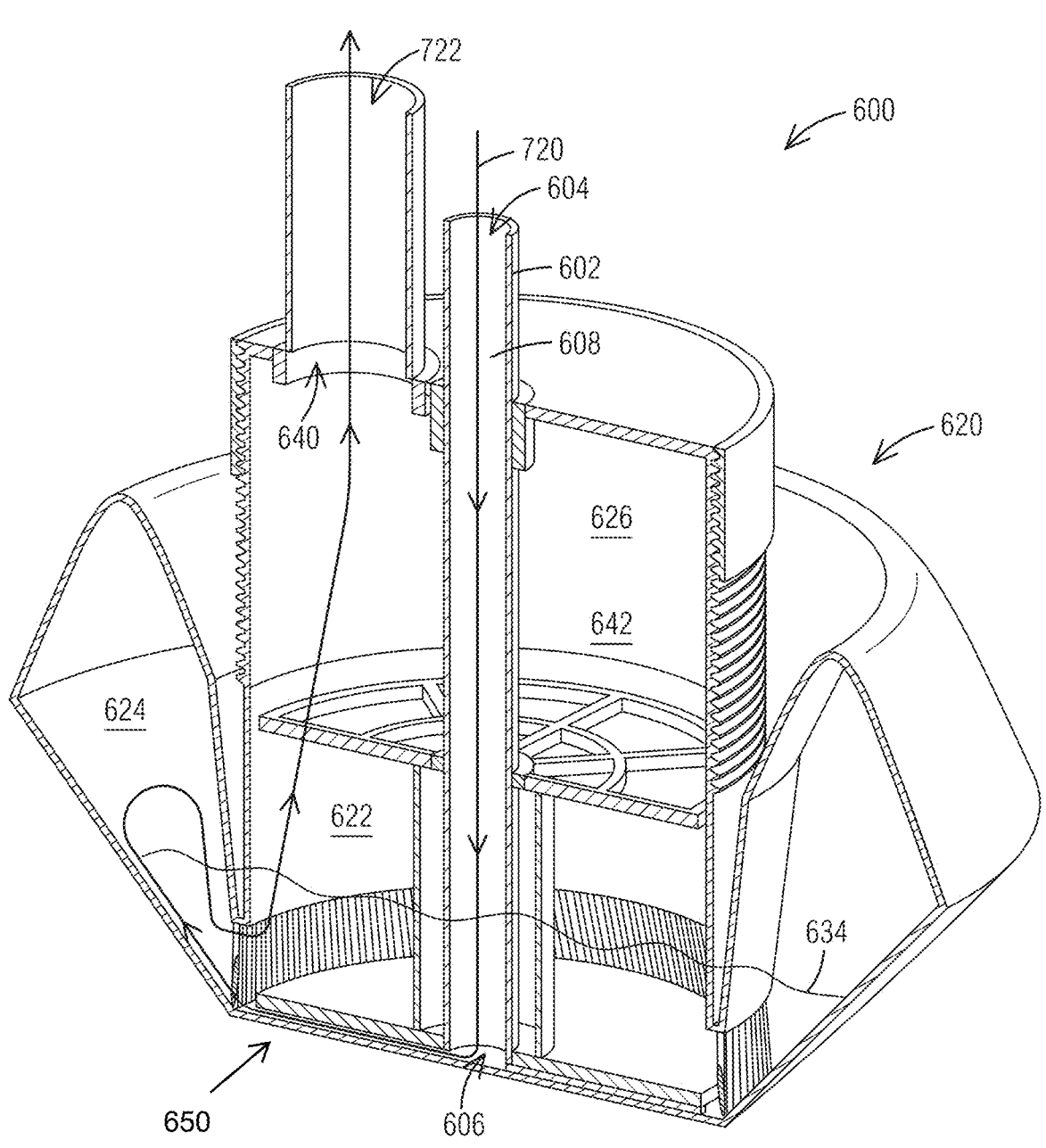
FIG. 6 is a cutaway view of an alternate example embodiment of a liquid bath air filter disclosed herein in an upright position.

FIG. 6 is a cutaway view of an alternate example embodiment of a liquid bath air filter 600 disclosed herein in an upright position. The liquid bath air filter 600 in this example embodiment includes an air inlet tube 602 having an inlet 604, an outlet 606, and defining an air inlet passage 608 therethrough. Also included is a filtrate chamber body 620 defining a lower portion 622, a toroid portion 624, and an upper portion 626 of a filtrate chamber 642. The lower portion 622 together with the toroid portion 624 are configured to hold a volume of liquid therein that defines an example liquid level 634. The filtrate chamber body 620 includes an outlet 640 through a top of the upper portion 626 of the filtrate chamber body 620.

A flow laminator 650 is positioned so that the flow laminator 650 is submerged in the liquid when the liquid bath air filter 600 is in the upright position shown in FIG. 6. The flow laminator 650 is designed to operate in the same manner as flow laminator 150. In an example embodiment, the flow laminator 650 is designed to accelerate the flow entering the flow laminator 650. Hence, in such an embodiment, the flow laminator 650 is a nozzle. A porous material designed to operate in the same manner as the buffer assembly 210 may be disposed in the upper portion 626.

As indicated by flow circuit 720, the air flows into the air inlet tube 602, then through the flow laminator 650, then into the lower portion 622, then into the toroid portion 624, then back into the lower portion 622 and through the liquid for a second time, then through the upper portion 626, then through the outlet 640 through the top of the filtrate chamber body 620, then out an outlet 722. In an example embodiment, a check valve (not shown) designed to operate in the same manner as check valve 200 may be part of the flow circuit 720 and may be secured to the outlet 722 to prevent air from entering the filtrate chamber 642 through the check valve. The check valve may be fluidically connected to an inlet of a continuous positive airway pressure therapy (CPAP) mask.

Figure 7:
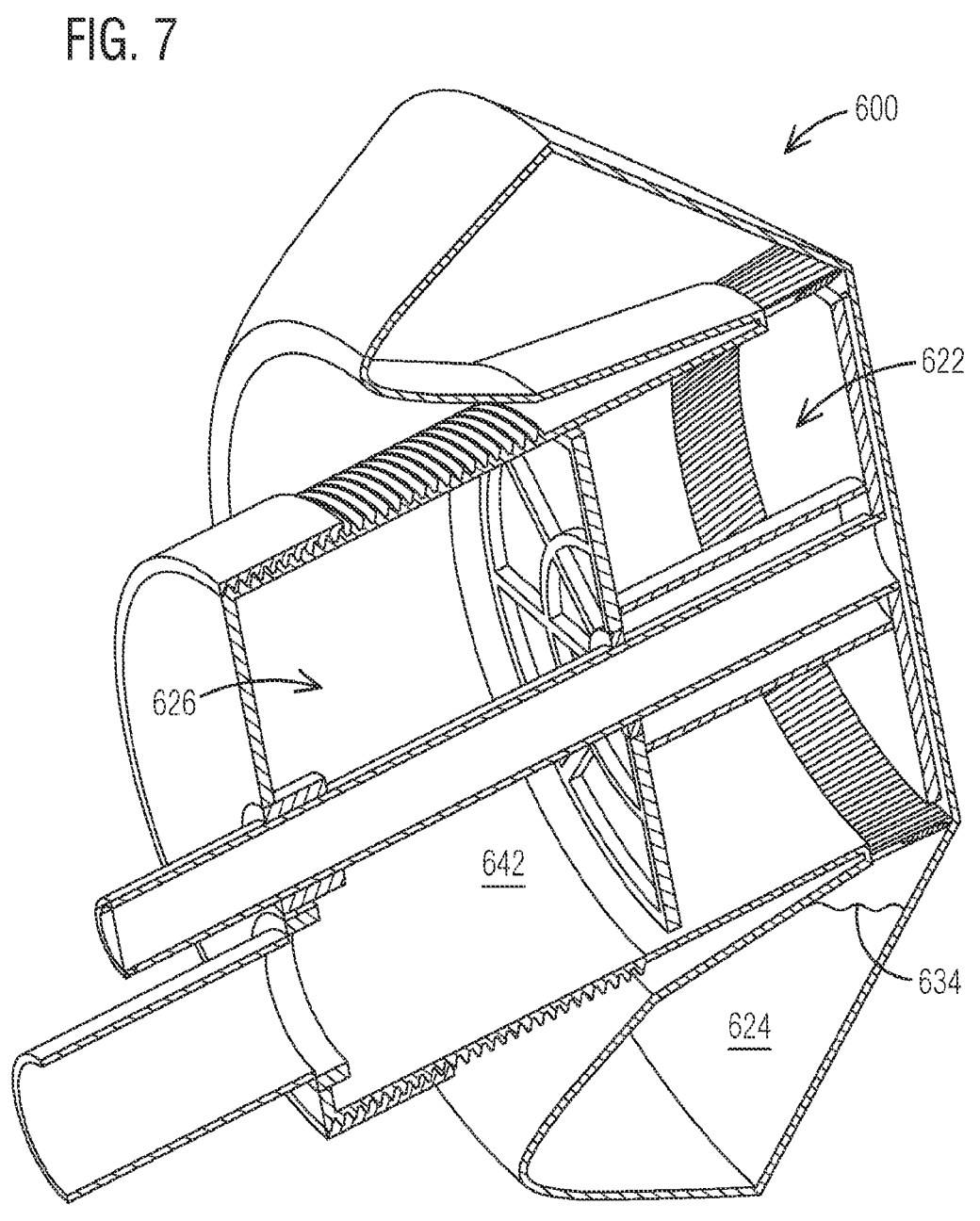

FIG. 7 is a cutaway view of the example embodiment of the liquid bath air filter 600 of FIG. 6 in a tilted position. Upon being tilted, the liquid previously disposed in the lower portion 622 passes into the toroid portion 624. The toroid portion 624 is water-tight, so the liquid remains in the toroid portion 624 until the liquid bath air filter 600 is returned to the upright position. The flow circuit 720 remains open when the liquid bath air filter 600 is tilted or in the upside-down position. The main difference, similar to the example embodiment shown in FIG. 2, is that the air ejected from the flow laminator 650 is not ejected into liquid because the liquid is moved by gravity into the toroid portion 626.

Figure 8:
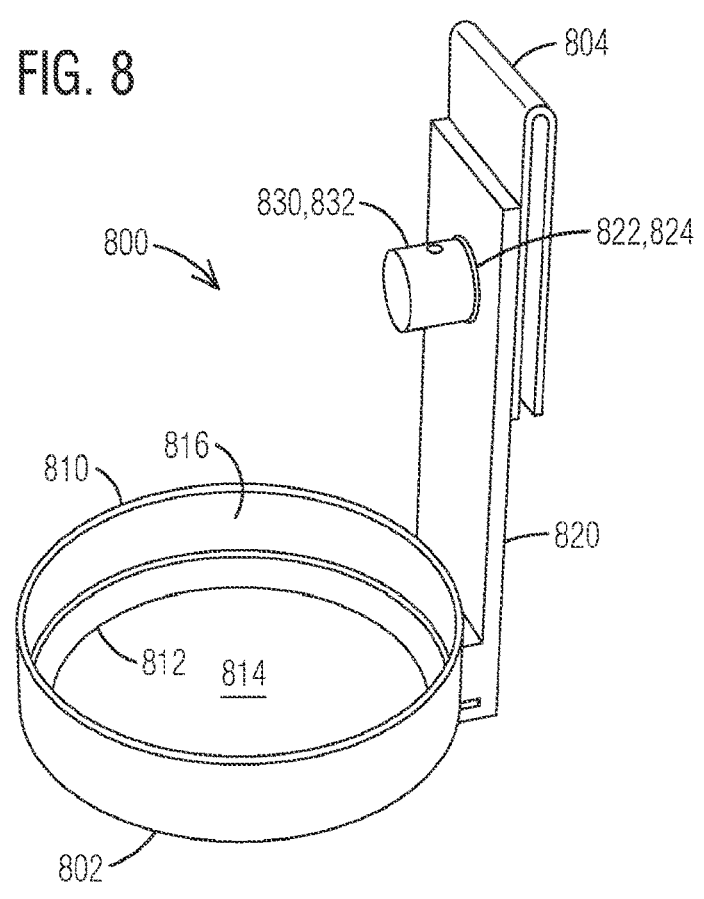
FIG. 8 is a perspective view of an example embodiment of a carry assembly used to secure the liquid bath air filter to a user.

FIG. 8 a perspective view of an example embodiment of a carry assembly 800 used to secure the liquid bath air filter 100 to a user. It includes a support bracket 802 secured to a clip 804 which can be, in turn, secured to a user's belt, waistband, or the like. The support bracket 802 includes a receptacle 810 that is configured to cooperate with a shape of the liquid bath air filter 100 to receive therein and support the liquid bath air filter 100. In the example embodiment shown, the receptacle 810 includes a lip 812, an opening 814, and a ring 816 into which the filtrate chamber body 120 is lowered. The lip 812 and the opening 814 cooperate with the shape of the filtrate chamber body 120 so that the liquid bath air filter 100 is cradled by the support bracket 802 and secured in place by gravity against most user movements. In this example embodiment, an upper end of the middle portion 124 of the filtrate chamber body 120 is supported by the lip 812. The ring 816 surrounds the upper portion 126 of the filtrate chamber body 120. Most of the middle portion 124 and all of the lower portion 122 are suspended below the lip 812.

The receptacle 810 is secured to a bracket 820 that has a first connection feature 822. In this example embodiment, the first connection feature 822 is a bracket hole 824 configured to cooperate with a second connection feature 830 of the clip 804. In this example embodiment, the second connection feature 830 is a post 832 that fits into the bracket hole 824. There may be more than one bracket hole 824 at different vertical locations in the bracket 820 so the bracket 820 can be positioned as desired by the user. In this example embodiment, the first connection feature 822 and the second connection feature 830 create a pivot joint that helps the liquid bath air filter 100 remain upright during certain motions created by a user. However, a pivot joint is not necessary. The first connection feature 822 and the second connection feature 830 can be any arrangement known to the artisan and suitable for such a connection. The first connection feature 822 and the second connection feature 830 can be interlocked to each other via a cotter pin 1000 (see FIG. 10) through the post 832 or other suitable retention feature known to the artisan.

The clip 804 can take any shape suitable for securing to a user. In this example embodiment, the clip 804 has a folded, a.k.a. upside-down U-shape, suitable to slip over a user's belt and/or waistband. When so attached, the clip 804, the support bracket 802, and the liquid bath air filter 100 are held in place at least by gravity. Further, the clip 804 can be made of a resilient material that is configured such that a resilience of the resilient material clamps the clip 804 onto the belt and/or waistband which aids in retaining the clip 804 thereon.

Figure 9:
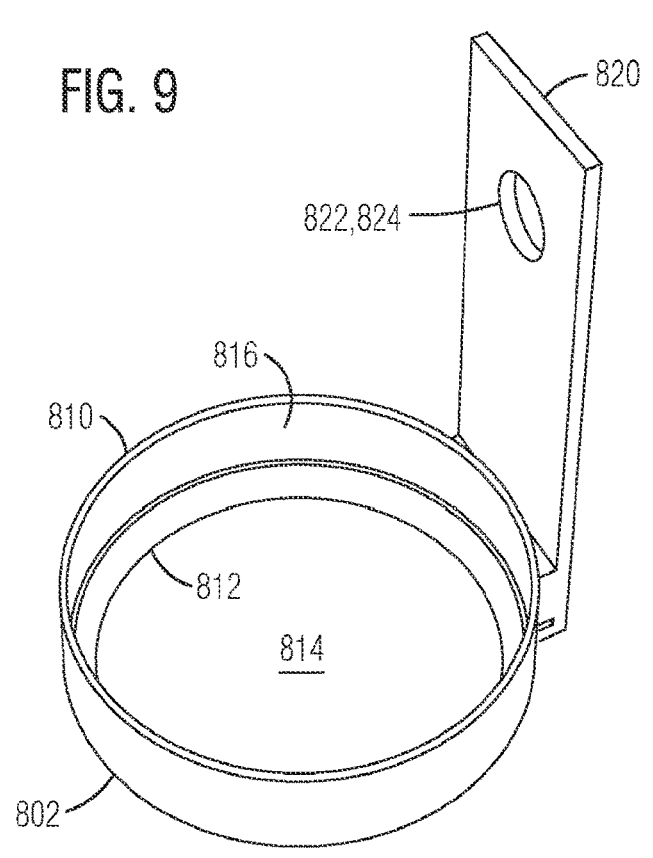
FIG. 9 is a perspective view of a support bracket of the carry assembly of FIG. 8.
Figure 10:
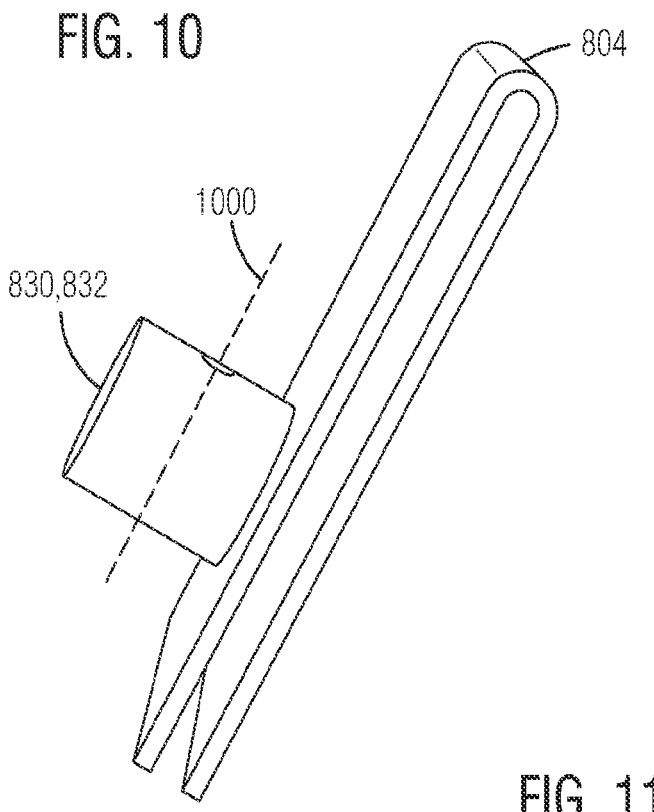
FIG. 10 and FIG. 11 are perspective views of a clip of the carry assembly of FIG. 8.
Figure 11:
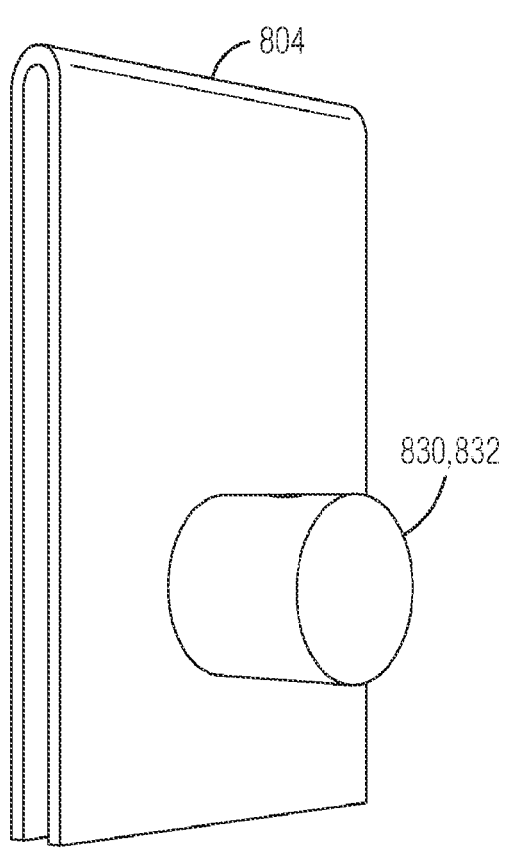

FIG. 9 is a perspective view of the support bracket 802 alone, and FIG. 10 to FIG. 11 are perspective views of the clip 804 alone.

The carry assembly 800 is easily secured to a user, permits easy installation and removal of the liquid bath air filter 100 in the carry assembly, and accommodates a variety of user movements while keeping the liquid bath air filter 100 generally upright. Hence, it provides a simple way for a user to carry the liquid bath air filter 100 in a variety of circumstances.

Figure 12:
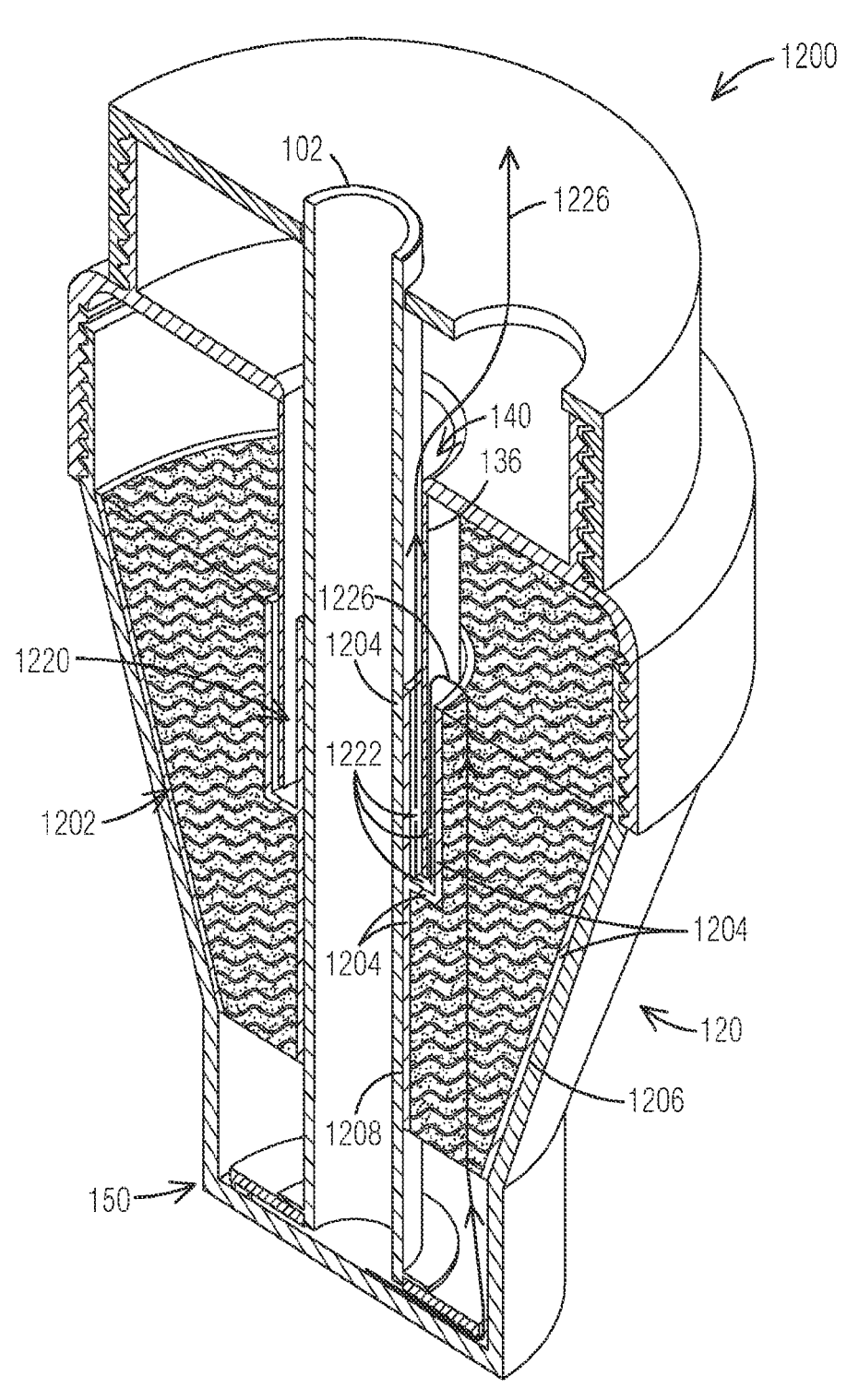
FIG. 12 is a cutaway view of an alternate example embodiment of the liquid bath air filter disclosed herein in an upright position.

FIG. 12 is a cutaway view of an alternate example embodiment of the liquid bath air filter 1200 disclosed herein in an upright position. The liquid bath air filter 1200 of FIG. 12 has a different buffer assembly 1202 than that of FIG. 1 but is otherwise the same or similar. In this example embodiment, the buffer assembly 1202 includes solid walls 1204. The walls 1204 form a seal 1206 with the filtrate chamber body 120 and a seal 1208 with the air inlet tube 102. The drain-stopping conduit 136 protrudes into a recess 1220 formed by the walls 1204 but does not form a seal with the walls 1204. Instead, a gap 1222 is formed between the drain-stopping conduit 136 and the walls 1204 which permits the air to flow along the flow circuit 1226 as shown.

In particular, the air flows from the flow laminator 150, fully through and out a top of the buffer assembly 1202, then downward into the recess 1220, under a bottom end of the drain-stopping conduit 136, and upwards out of the recess 1220 toward the outlet 140. This design results in a more tortuous flow circuit 1226 that maximizes the benefits associated with the buffer assembly 1202. As with the example embodiment of FIG. 1, if the liquid bath air filter 1200 is turned upside down, the liquid can flow through the buffer assembly 1202 and hence remain trapped within the liquid bath air filter 1200 as disclosed above.

Figure 13:
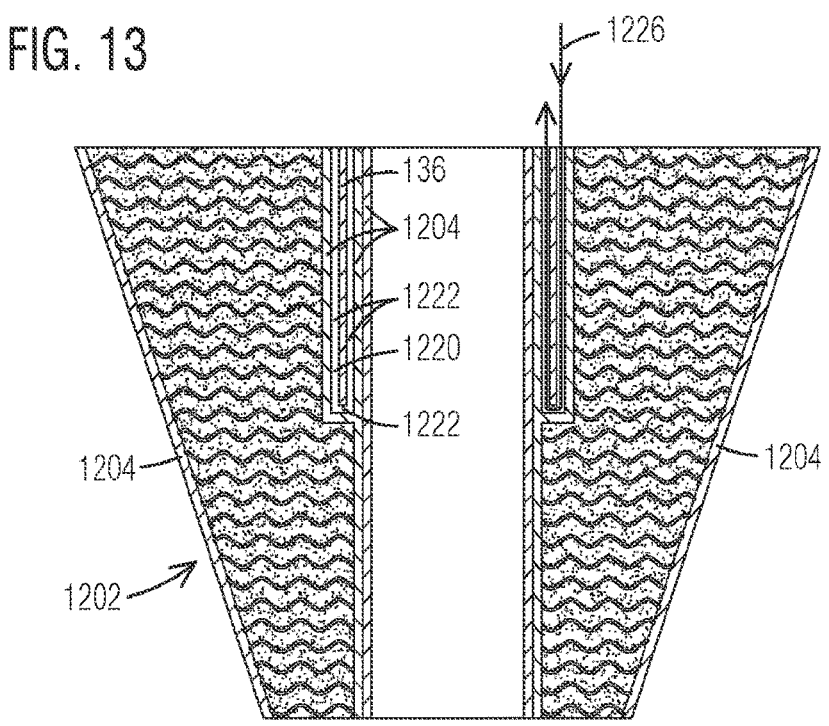
FIG. 13 is a cutaway view of the buffer assembly of the liquid bath air filter of FIG. 12.
Figure 14:
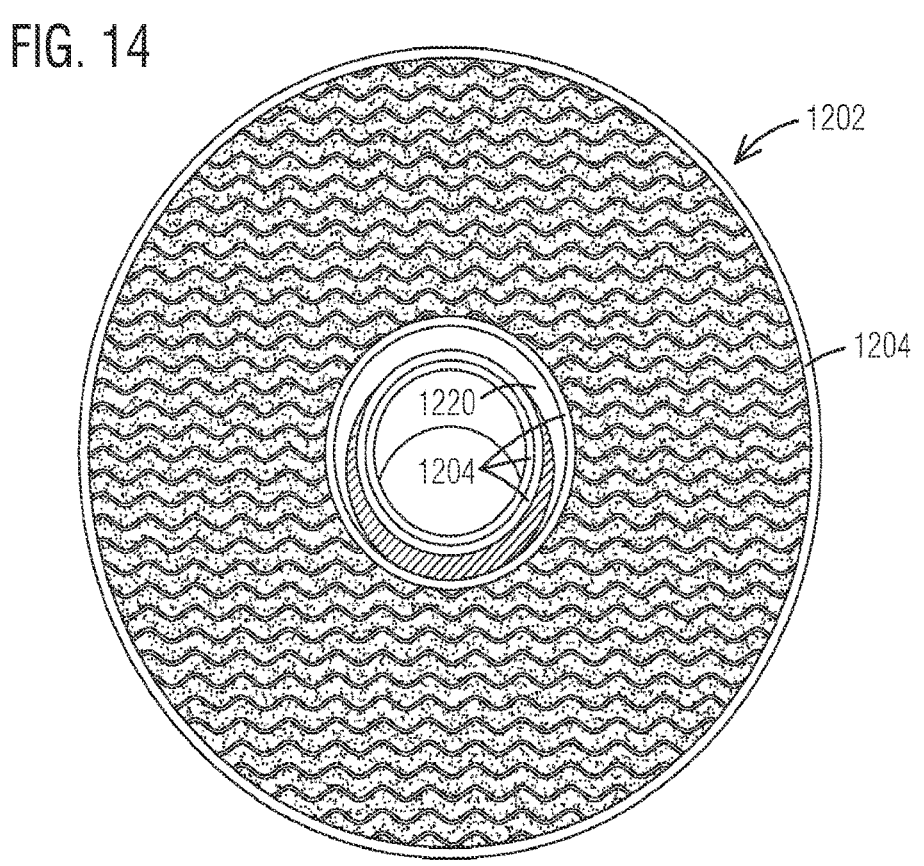
FIG. 14 is a top view of the buffer assembly of the liquid bath air filter of FIG. 12.

FIG. 13 and FIG. 14 show side and top views respectively of the buffer assembly 1202 of FIG. 12. FIG. 13 also includes a portion of the drain-stopping conduit 136 for reference.

Figure 15:
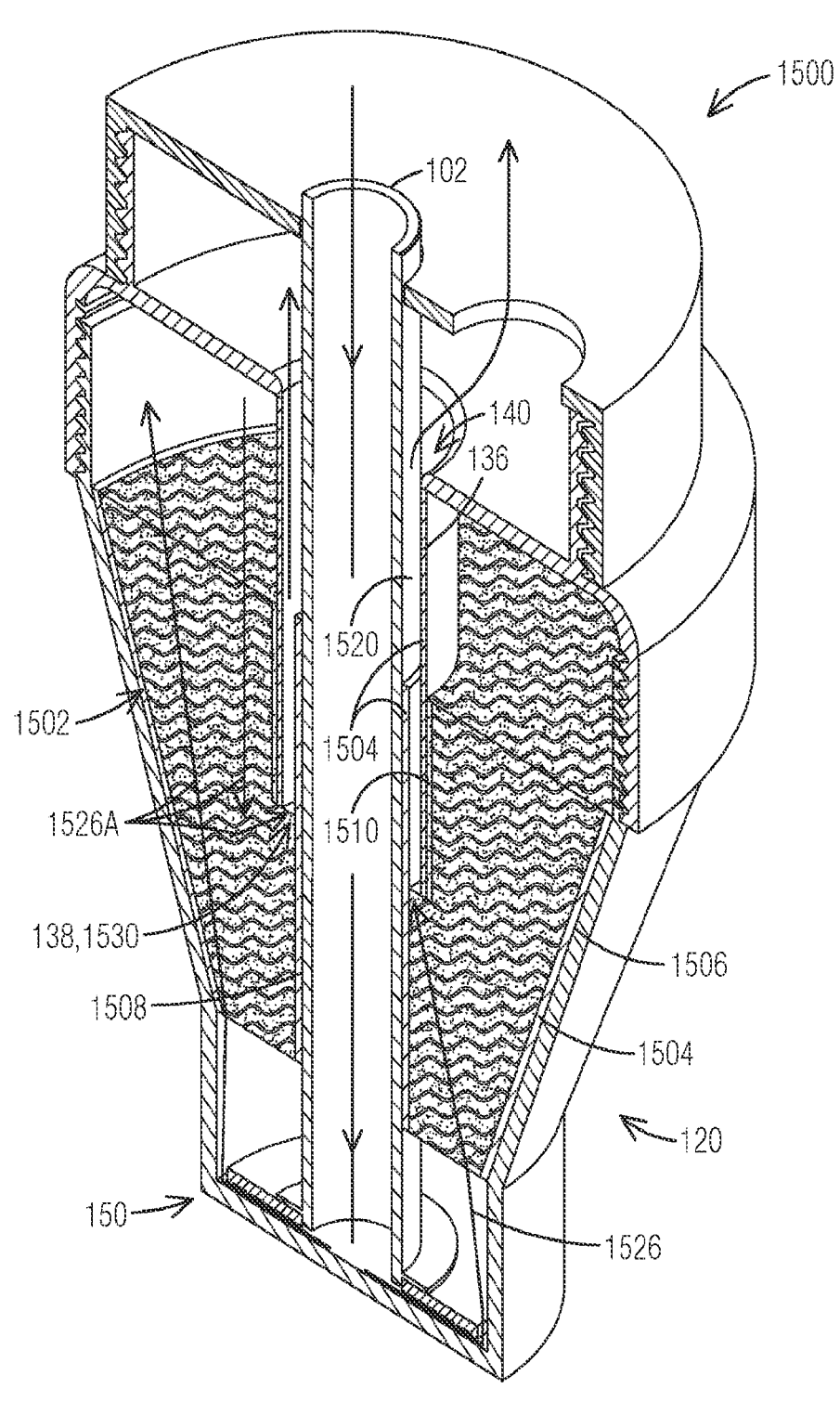
FIG. 15 is a cutaway view of an alternate example embodiment of the liquid bath air filter disclosed herein in an upright position.

FIG. 15 is a cutaway view of an alternate example embodiment of the liquid bath air filter 1500 disclosed herein in an upright position. The liquid bath air filter 1500 of FIG. 15 has a different buffer assembly 1502 than that of FIG. 1 but is otherwise the same or similar. In this example embodiment, the buffer assembly 1502 includes solid side walls 1504, but also includes an opening 1530 between the solid sidewalls 1504. In an example embodiment, the opening 1530 coincides with the inlet 138 of the drain-stopping conduit 136. The solid side walls 1504 form a seal 1506 with the filtrate chamber body 120 and a seal 1508 with the air inlet tube 102. The drain-stopping conduit 136 protrudes into a recess 1520 formed by the walls 1504 and forms a seal 1510 with the solid side wall 1504.

Figure 16:
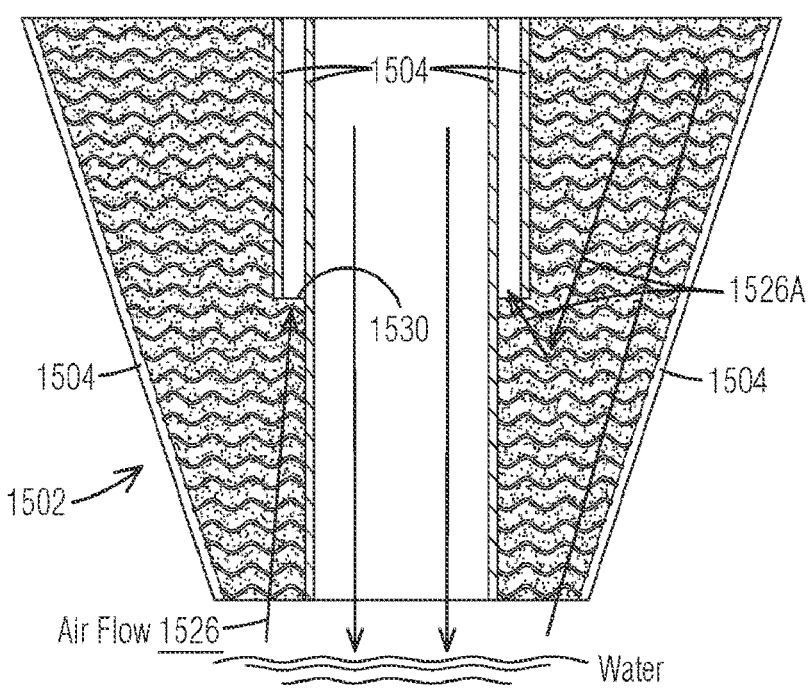
FIG. 16 is a cutaway view of the buffer assembly of the liquid bath air filter of FIG. 15.
Figure 17:
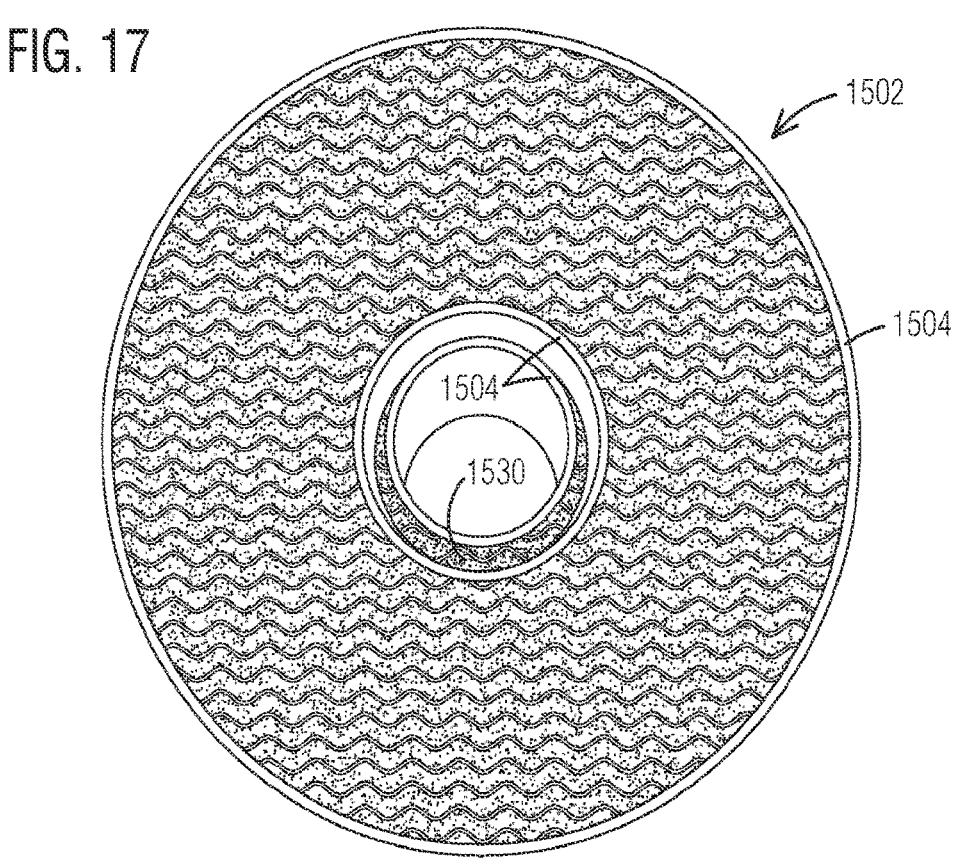
FIG. 17 is a top view of the buffer assembly of the liquid bath air filter of FIG. 15.

In particular, the air flows from the flow laminator 150 toward the opening 1530. The air is free to flow directly to the opening via circuit 1526 or indirectly via circuit 1526A. After entering the opening 1530, the air flows upwards out of the recess 1520 toward the outlet 140. As with the example embodiment of FIG. 1, if the liquid bath air filter 1200 is turned upside down, the liquid can flow through the buffer assembly 1502 and hence remain trapped within the liquid bath air filter 1500 as disclosed above. FIG. 16 and FIG. 17 show side and top views respectively of the buffer assembly 1502 of FIG. 15.

In light of the foregoing, it can be seen that the inventors have created a high-capacity, reliable, durable, reusable, inexpensive, and easy to operate, clean, and maintain filtration system for respiration. Hence, it represents an improvement in the art.

While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:

1. An apparatus, comprising:
    an air inlet tube that defines an air inlet passage;
    a filtrate chamber body that defines a filtrate chamber configured to hold a liquid in a lower portion thereof; and
    a flow laminator configured to: receive air from the air inlet passage; be submerged in the liquid present in the filtrate chamber when the apparatus is in an upright position; reduce a Reynold's number of a flow of the air therethrough; and eject the flow into the liquid in the filtrate chamber, wherein the filtrate chamber body comprises a lower portion, a middle portion, and an upper portion, the upper portion comprising a volume at least as large as a volume of the lower portion, wherein the filtrate chamber body comprises a drain-stopping conduit comprising an inlet in the middle portion and an outlet through a top of the filtrate chamber body, wherein when inverted the liquid flows from the lower portion to the upper portion where the liquid is trapped because the inlet in the middle portion is disposed above the liquid that is trapped in the upper portion.

2. The apparatus of claim 1, wherein the flow laminator comprises a nozzle which accelerates the flow being directed from the air inlet passage into the liquid in the filtrate chamber.

3. The apparatus of claim 1, wherein the flow laminator comprises cooperating walls that define an annular flow path, wherein a radially inner edge of the annular flow path receives the air from the air inlet passage, and wherein a radially outer edge of the annular flow path ejects the air into the liquid in the filtrate chamber.

4. The apparatus of claim 3, wherein the cooperating walls are configured to maintain a constant distance from each other from the radially inner edge to the radially outer edge.

5. The apparatus of claim 4, wherein the constant distance is not greater than one millimeter.

6. The apparatus of claim 3, wherein the flow laminator further comprises flow separators between the cooperating walls that divide the annular flow path into an array of annular flow paths.

7. The apparatus of claim 6, wherein the flow separators extend radially and circumferentially with respect to a center of the annular flow path and are thereby configured to eject flows from the annular array of flow paths both radially and circumferentially into the liquid in the filtrate chamber.

8. The apparatus of claim 1, wherein the filtrate chamber is configured to redirect the flow ejected from the flow laminator, thereby enhancing a mixing of the air and the liquid in the filtrate chamber.

9. The apparatus of claim 1, wherein air ejected into the liquid in the lower portion exits the liquid, travels through the drain-stopping conduit, and exits the filtrate chamber body via the outlet through the top of the filtrate chamber body.

10. The apparatus of claim 1, further comprising a buffer assembly disposed in the middle portion and configured to filter air exiting the liquid and enroute to the inlet of the drain-stopping conduit.

11. The apparatus of claim 10, wherein air ejected into the liquid in the lower portion exits the liquid, travels through the buffer assembly into the upper portion, then toward the drain-stopping conduit.

12. The apparatus of claim 1, wherein the air inlet tube extends from the flow laminator, through the drain-stopping conduit, and out of the filter chamber body via the outlet through the top of the filtrate chamber body.

13. The apparatus of claim 12, further comprising a lid that comprises a lid outlet, wherein the lid fluidically isolates the outlet through the top of the filtrate chamber body from an inlet of the air inlet passage and delivers the air from the outlet through the top of the filtrate chamber body to the lid outlet.

14. The apparatus of claim 13, further comprising a check valve connected to the lid outlet and configured to prevent the air from entering the apparatus through the lid outlet.

15. An apparatus, comprising:

a filtrate chamber body that defines a filtrate chamber comprising: an upper portion; a middle portion; a lower portion configured to hold a liquid; and a drain-stopping conduit comprising an inlet in the middle portion and an outlet through a top of the filtrate chamber body;

an air inlet tube;

a flow laminator configured to: receive air from the air inlet tube; be disposed in the lower portion; and reduce a Reynold's number of a flow of the air therethrough; and a flow circuit in which air flows into the air inlet tube, then through the flow laminator, then into the lower portion, then into the middle portion, then through the drain-stopping conduit, then through the outlet through the top of the filtrate chamber body;

wherein when the apparatus is in an upright position and the liquid is disposed in the lower portion an outlet of the flow laminator is submerged in the liquid, and wherein in an upside-down position the liquid is retained in the upper portion and the flow circuit remains open.

16. The apparatus of claim 15, further comprising a buffer assembly disposed in the middle portion, wherein in the flow circuit the air flows through the buffer assembly when flowing through the middle portion.

17. The apparatus of claim 16, wherein when the apparatus transitions from the upright position to the upside-down position the liquid flows through the buffer assembly enroute to the upper portion, thereby wetting the buffer assembly where the air flows through the buffer assembly.

18. The apparatus of claim 15, wherein the flow laminator comprises a nozzle.

19. The apparatus of claim 18, wherein the nozzle comprises cooperating walls that define an annular flow path, wherein a radially inner edge of the annular flow path receives the air from the air inlet passage, and wherein a radially outer edge of the annular flow path is the outlet of the flow laminator and ejects the air into the filtrate chamber.

* * * * *